United States Patent [19]

Carreau et al.

[11] 4,229,082
[45] Oct. 21, 1980

[54] SELECTIVE OPTICAL FILTER

[76] Inventors: Bernard A. Carreau, 14, Passage Duguesclin, 75015 Paris, France; Gabriel Lombard, 175, rue de la Pompe, 75016 Paris, France

[21] Appl. No.: 903,483

[22] Filed: May 8, 1978

[30] Foreign Application Priority Data

May 6, 1977 [FR] France .............................. 77 13840
Feb. 27, 1978 [FR] France .............................. 78 05521

[51] Int. Cl.² .............................................. G02C 7/10
[52] U.S. Cl. ......................................... 351/44; 351/45
[58] Field of Search .................. 351/44, 41, 45; 16/65, 16/52, 78, 83; 2/15

[56] References Cited

U.S. PATENT DOCUMENTS

| 560,418 | 5/1896 | Lorenz | 351/41 |
| 1,180,341 | 4/1916 | Thomas | 351/44 |
| 1,865,691 | 7/1932 | Hill | 351/44 |
| 1,957,071 | 5/1934 | Marchner | 351/44 |
| 3,592,525 | 7/1971 | Schulty | 351/41 |

FOREIGN PATENT DOCUMENTS

| 1330277 | 5/1962 | France | 351/44 |
| 266245 | 2/1927 | United Kingdom | 351/44 |

Primary Examiner—John K. Corbin
Assistant Examiner—B. W. de los Reyes
Attorney, Agent, or Firm—Armstrong, Nikaido, Marmelstein & Kubovcik

[57] ABSTRACT

A selective optical filter, intended to be placed before the eyes for protection and for improvement of vision, features a plurality of different light absorption zones comprising a central zone which is completely light permeable, or has low light absorption capability, a zone surrounding this central zone which is light permeable but has a relatively high light absorption capability, the said zone being included between the periphery of the central zone and a cone having its apex at the optical center of the eye and an included angle of between about 15° and 30°, and the outer periphery of the zone adjoining a further zone of low light absorption capability corresponding to the peripheral part of the retina.

8 Claims, 7 Drawing Figures

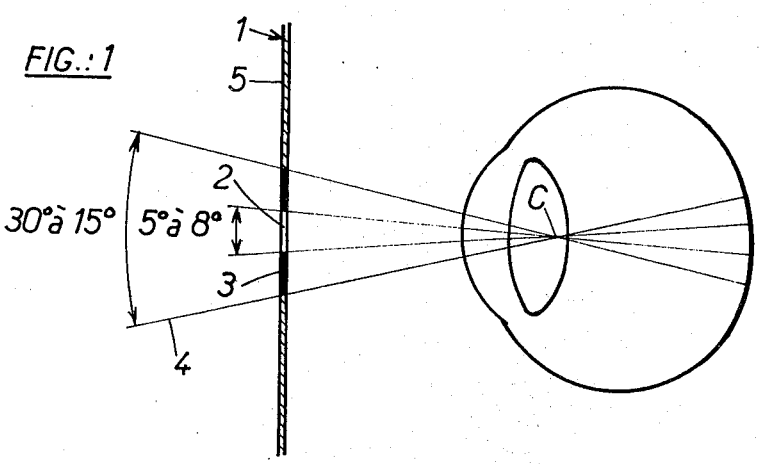
FIG.: 1
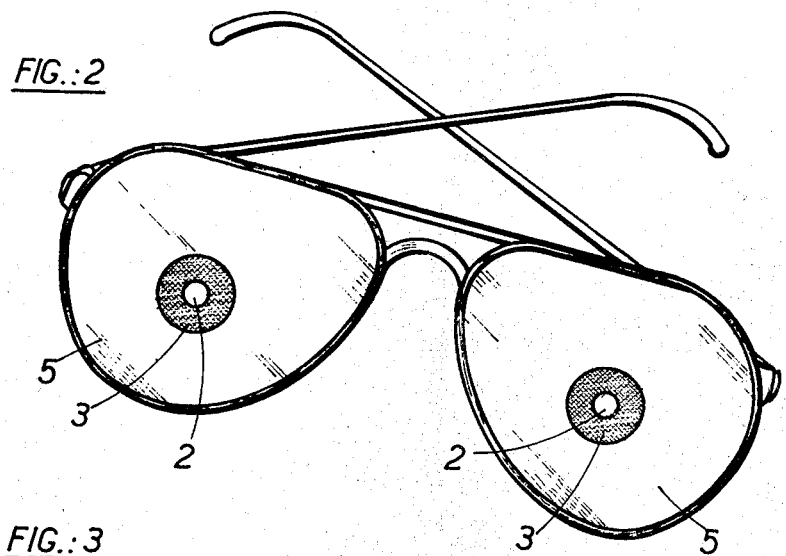
FIG.: 2
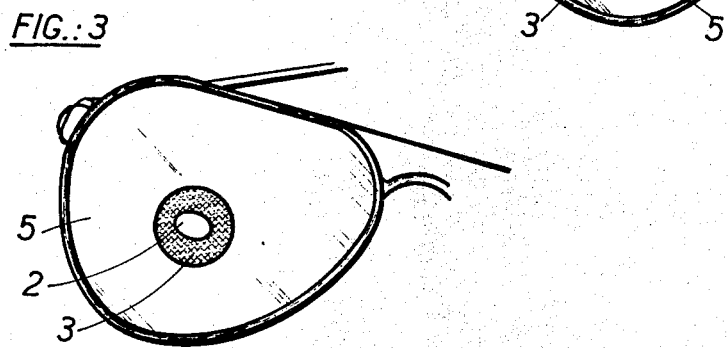
FIG.: 3

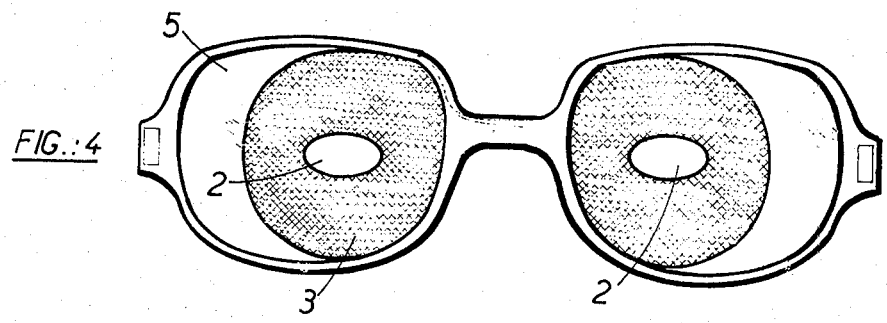
FIG.:4
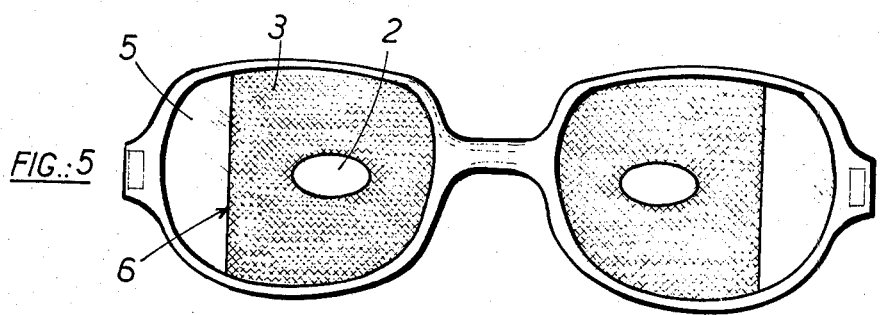
FIG.:5
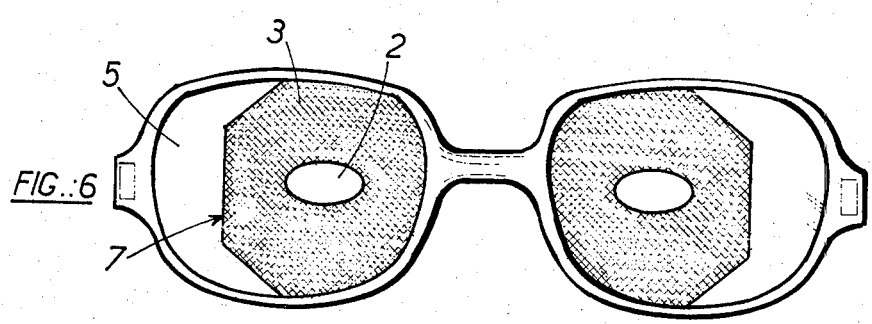
FIG.:6
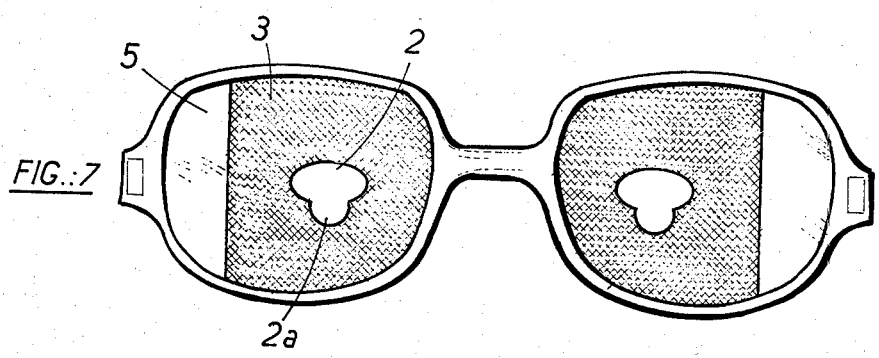
FIG.:7

SELECTIVE OPTICAL FILTER

This invention relates to the problem of improved use of the properties of the eye to enable it to have better vision in variable light, at the same time protecting it from intense light which can bring about the phenomenon of dazzle, for example when driving a car at night, practising sport (especially on snow) etc.

It is known that, in a central zone of the eye, the angular dimension of which is about 5°, the retina is particularly rich in light receptors, this richness culminating at the level of the central cluster of foveolarous cones. This zone of the retina is that which permits the sharpest separation and determines what is called keenness of vision. In this zone the threshold of light perception is very high and its essential function is that of photopsic vision.

On the other hand, at low levels of illumination, this central zone is practically blind and separation ability is transferred to the edges of the fovea. Although this peripheral zone of the fovea has a weak separation capability, it is, on the other hand, much more sensitive to the light of nighttime.

This great sensitivity leads, also in the case of intense light, to the phenomenon of general dazzle of the eye and hinders the perception of details of objects seen by the eye. This is what occurs whilst driving at night when vehicles pass each other.

To combat this phenomenon, it has thus been proposed to place before the eyes, for example for night driving, protective filters which can be in the form of spectacles featuring a central zone which is very light permeable, or even consists of a simple hole, this zone being surrounded by an opaque part.

The applicants have found, however, that these filter devices, by not taking completely into account the properties of the composition of the retina, have the disadvantage of causing dead angles of vision which can be dangerous, for example when driving vehicles. On the other hand, the employment of the peripheral part of the retina, at least in the temporal region, is highly desirable, as much in the already mentioned night driving as in driving by day or in other activities, to enable the perception of objects situated or moving laterally.

The perfected ocular filter which constitutes the object of the invention is characterised by the existence of at least three zones before each eye, i.e. a central zone, completely light permeable or with low light absorption capability, a non-opaque annular zone having a certain light absorption capability surrounding the central zone and of which the outer contour is on a conical angle, subtended at the optical centre of the eye, of between about 15° to 30°, and a weakly absorbing outer zone which receives light rays going to the peripheral part of the retina, at least in the temporal region.

Such a filter allows the vision to retain the activity of the foveal zone of the retina with its high separating capability, to provide protection against dazzle to the sensitive part of the retina which surrounds the foveal zone, and to retain the activity of the peripheral part of the retina in not reducing the field of vision and in eliminating dead angles which can be produced with the previously proposed filters. For example, in the sudden passage from a high level to a low level of illumination, as when entering a tunnel, the filter according to the invention avoids an excessive drop in lateral light perception which, with known filters, can create a real dead angle of vision.

The following description, with respect to the attached drawing given as a non-limiting example, will fully explain how the invention is achieved, characteristics which emerge from the drawing as well as the text forming, of course, part of the said invention.

FIG. 1 shows, in a diagrammatic vertical section, an eye and the relevant protective filter, FIG. 2 shows a pair of spectacles according to the invention from the front, FIG. 3 shows an alternative embodiment, and FIGS. 4 to 7 show four different embodiments of spectacles, modified according to this invention.

In FIG. 1 is shown a diagrammatic representation of an eye with its optical centre at C. A cone having its apex at C and an included angle of about 5° to 8° substantially covers the foveal zone of the retina.

A filter 1 placed before each eye, for example in the form of a spectacles glass, is made in such a way that its central zone 2 defined by the aforementioned cone is perfectly transparent to light, or at the most is weakly absorbent, being, for example, slightly tinted to eliminate the greater part of the ultra-violet rays.

Round this central zone, the filter includes an annular zone 3, which is fairly light absorbent, but not opaque, the outer contour of which zone is defined by a cone 4 having its apex at C and an included angle of between 15° and 30°. On the retina, the annular area between the outlines of these two cones practically corresponds to the area of maximum light sensitivity, this part being thus responsible for the dazzle phenomenon which the eye undergoes when it is subjected to very intense light. The capacity for light absorption of zone 3 of the filter thus protects this part of the retina by reducing the light intensity, at the same time permitting the perception of objects.

Finally, the remainder 5 of the filter, around the annular zone 3, has a low light absorbing capability like the central part 2, so that the peripheral zone of the retina which is affected by this part 5 of the filter receives the light which was intended for it. In FIG. 2 there can be seen a front view of a pair of spectacles according to the invention.

Each of the "glasses", which can be made of mineral glass or of organic material or plastics, consists of the three concentric zones described above which, for each eye, are centred on the optical axis of that eye. To make these glasses, spraying with colouring matter can be used, according to well known processes and using suitable masks in the phase of the process where it is a matter of carrying out dense spraying on the annular region 3.

As a non-limiting example, values can be given for the light absorption of each of the three zones of the filter:

central zone 2, absorption between 0 and 10%, annular zone 3, absorption between 30 and 80%, for preference between 50 and 75%, peripheral zone 5, absorption between 0 and 20%.

The zones may be tinted grey, green or brown. Demarcation between the zones may be sharp or progressively graded.

As a variation, the central zone 2 can be a simple hole, although it is preferable to have a continuity of the filter material to avoid the jet of air which a hole might occasion.

FIGS. 4 to 7 show four different embodiments of spectacles modified according to this invention.

In FIGS. 4 to 6, the central zone 2, perfectly transparent or at the least weakly light absorbent, for example slightly tinted to eliminate the greater part of the ultraviolet rays, has an oval shape which is advantageous because of the preponderance of horizontal ocular movements.

Centred on the optical axis of each of the eyes in vision to infinity, this central zone is surrounded by the zone 3 the light absorption power of which is between 30% and 80%, for preference between 50 and 75% approximately.

The shape of this zone 3 may be varied. In the case of FIG. 4, for example, it covers the part of each of the glasses adjacent the nose-piece, and is bounded on the other or temporal side by a curve tangential to the upper and lower edges of the glass. The zone 3 stops short of the temporal side of the glass to allow at this point on the glass a zone 5 which is completely transparent, or which has low light absorption capability, thus freeing the temporal field of vision.

The demarcation line between the zones 3 and 5 can have different shapes. If the vertical dimension of the glasses is very large, this line may not reach the top and the bottom of the glasses so as to leave the transparent zone 5 (and consequently the field of vision without a filter) at the top and at the bottom also.

As a variation, the demarcation line may be a segment of a vertical straight line (such as 6, FIG. 5) or even an angled line (such as 7, FIG. 6).

To facilitate the perception of near objects, for example the perception of road signs when driving, without having to tilt ones head, the central zone 2 may feature a downward extension 2a on its lower edge, as shown in FIG. 7.

To permit both distance vision and the perception of near objects situated low down, the shape of the central zone may be in the form of a vertical "8".

We claim:
1. A selective optical filter for use with eyes for the protection and improvement of the vision thereof, said filter comprising, a plurality of different light absorption zones, said zones including a central zone having a low light absorption capability, a second zone surrounding the central zone the second zone being light permeable and having a relatively high light absorption capability, and a third zone extending from at least a portion of the outer periphery of the second zone, the third zone having a low light absorption capability.

2. A selective optical filter according to claim 1, wherein the central zone is completely light permeable.

3. A selective optical filter according to claim 1, wherein the second zone surrounding the central zone has a light absorption power between 30 and 80%.

4. A selective optical filter according to claim 1, wherein the second zone has a light absorption power between 50 and 75%.

5. A selective optical filter according to claim 1, wherein the central zone has a circular shape defined by a cone having its apex at the optical centre of the eye and a vertex angle of between about 5° to 8°.

6. A selective optical filter according to claim 1, wherein the central zone has an oval shape, the major axis being horizontal and subtending an angle of about 15° at the optical centre of the eye, and the minor axis subtending an angle of between 5° and 8° at the optical centre of the eye.

7. A selective optical filter according to claim 1, including a spectacle frame having the optical filter mounted therein, wherein the second zone extends as far as the nose-piece of the the spectacle frame and the second zone is adjacent to the third zone in the temporal portion of the spectacle frame.

8. A selective optical filter as set forth in claim 1 wherein the transition between the second and third zones is progressive.